May 6, 1941.  W. R. FREEMAN  2,241,191
PRESSURE REDUCING VALVE MECHANISM FOR FLUID BRAKES
Filed Sept. 2, 1939
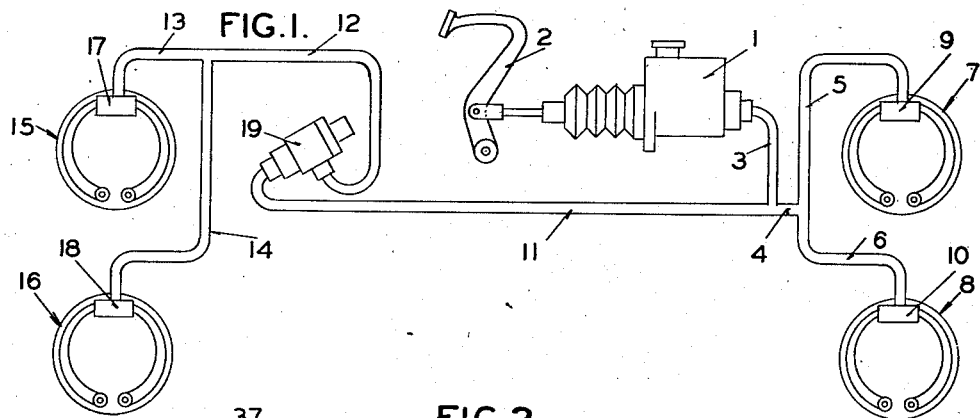
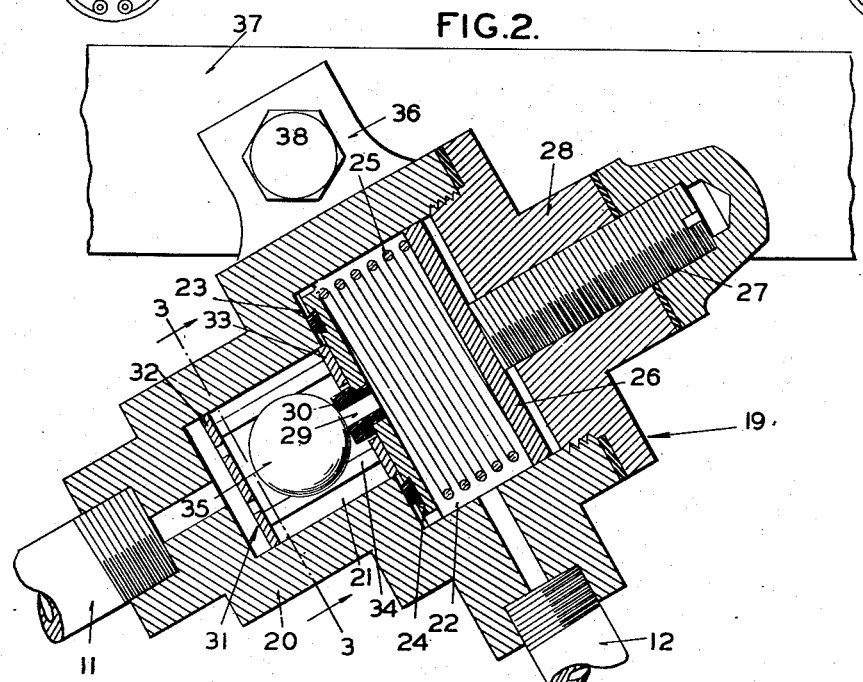
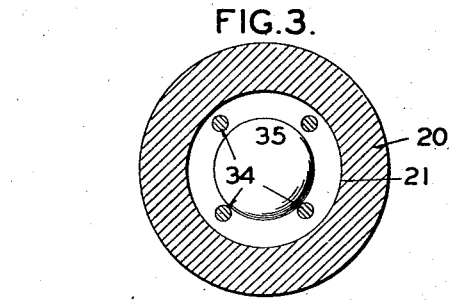
INVENTOR
W.R. FREEMAN
BY
*J. E. Huffman*
ATTORNEY Patented May 6, 1941

2,241,191

UNITED STATES PATENT OFFICE 2,241,191

PRESSURE REDUCING VALVE MECHANISM FOR FLUID BRAKES

Walter R. Freeman, University City, Mo., assignor to Wagner Electric Corporation, St. Louis, Mo., a corporation of Delaware Application September 2, 1939, Serial No. 293,177

9 Claims. (Cl. 188—152)

My invention relates to braking apparatus and more particularly to reducing valve mechanism for association with a fluid pressure actuating system.

One of the objects of my invention is to provide reducing valve mechanism automatically controlled by the rate of deceleration of a vehicle for reducing the fluid pressure being applied by a source of pressure to a fluid motor for actuating a brake of a braking system having a plurality of fluid motor-actuated brakes operated by the same source of pressure.

Another object of my invention is to produce a reducing valve mechanism for use in a fluid pressure conduit and which will be caused to be operative by the action of inertia.

Other objects of my invention will become apparent from the following description taken in connection with the accompanying drawing in which Figure 1 is a diagrammatic view of a fluid-actuated braking system having associated therewith my improved reducing valve mechanism; Figure 2 is a longitudinal cross-sectional view of the valve mechanism; and Figure 3 is a cross-sectional view taken on the line 3—3 of Figure 2.

Referring to the drawing in detail, numeral 1 indicates a master cylinder device which is operated by a pedal 2 to develop fluid pressure. The outlet of the master cylinder is connected by a conduit 3 with conduits 4, 5 and 6 leading to the front wheel brake assemblies 7 and 8, the shoes of which are actuated by fluid motors 9 and 10. The conduit 3 also communicates with conduits 11, 12, 13 and 14 which lead to the rear wheel brake assemblies 15 and 16, the brake shoes of which are actuated by fluid motors 17 and 18.

In accordance with my invention, I interpose between the conduits 11 and 12, leading to the fluid motors of the rear brakes, a reducing valve mechanism 19 which is automatically controlled by the action of inertia in accordance with a predetermined rate of deceleration to thereby cause the fluid pressure effective in the fluid motors 17 and 18 of the rear brakes to be less than that developed by the master cylinder device and which is effective in the fluid motors 9 and 10 of the front wheel brakes.

The particular reducing valve mechanism disclosed comprises a casing 20 provided with stepped bores 21 and 22. The bore 21 is connected to the conduit 11 and is in constant communication with the master cylinder and the bore 22 is connected to the conduit 12 leading to the fluid motors of the rear brakes. The shoulder at the juncture of the bores forms a valve seat 23 and cooperating therewith is a movable valve element 24 biased against said seat by a spring 25 interposed between the valve element and a plate 26 which abuts an adjusting screw 27 carried by the closure plug 28 for the end of the large bore.

The valve element 24 is provided with a central passage 29 and associated with this passage is an annular valve element 30 made of rubber or like material. Within the small bore 21 is a cage 31 comprising end plates 32 and 33 and connecting rods 34. The lower two rods of the cage form a track for a ball 35 which is adapted to cooperate with the valve element 30 to close the passage through the movable valve element 24. The casse 20 of the reducing valve mechanism is formed with an attaching lug 36 for adjustably mounting the casing on a suitable support 37 by a bolt 38.

In operation the casing of the valve mechanism is so mounted on the support that the track for the ball is longitudinally positioned and inclined forwardly to the horizontal when the vehicle is on a level roadway so that the ball, under the action of gravity, will be normally positioned away from the valve element 30 in order that fluid will be free to flow in both directions through the passage 29 of the movable valve element 24. Thus, under these conditions, when the master cylinder is operated, fluid under uniform pressure will be transmitted to the fluid motors of all the brakes to thereby actuate the brakes. When the rate of deceleration of the vehicle with the brakes being applied becomes of such value that the action of inertia will cause the ball 35 to roll up the track and against the valve element 30 to close off the passage 29, the fluid motors of the rear brakes will be cut off from the master cylinder. If a predetermined additional pressure (determined by strength of spring 25) is now developed by the master cylinder, this pressure will be effective on the front wheel motors 9 and 10 but will not be effective on the rear brake motors 17 and 18 because of the closed condition of the valve mechanism. When the increased pressure developed by the master cylinder becomes great enough to overcome the action of the spring 25 and move the movable valve element 24 off shoulder 23, additional fluid pressure will be effective in the fluid motors 17 and 18 of the rear brakes together with that in the fluid motors 9 and 10. This fluid pressure will be less than that developed by the master cylinder by an amount equal to the pressure required to unseat the valve element 24 against the action of spring 25. It is thus seen that when the rate of deceleration is such as to cause the ball to close the passage 29 and additional pressure is developed by the master cylinder, the fluid pressure effective in the front brake motors will thereafter always be greater by a fixed amount than the fluid pressure in the fluid motors of the rear brakes. For example, if it takes twenty pounds of pressure to unseat the valve element 24, then when the ball closes the passage 29, the fluid in the fluid motors of the front brakes will have its pressure increased twenty pounds per square inch before any additional pressure is applied to the fluid in the fluid motors of the rear brakes. Thereafter, as the master cylinder is continued to be operated, the fluid pressure in the front brake fluid motors will always be twenty pounds per square inch greater than the fluid pressure in the fluid motors of the rear brakes.

By the use of the automatically operable reducing valve mechanism in the braking system, more efficient braking of the vehicle is possible. When the brakes on the vehicle are initially operated, the weight of the vehicle is substantially equally distributed on all four wheels and, therefore, a uniform braking action on the front and rear wheels is desirable. However, as the rate of deceleration of the vehicle increases, the weight of the vehicle is shifted to the front wheels and, therefore, it is desirable to have less braking action on the rear wheels than on the front wheels as the rear wheels do not contact the surface of the roadway with as great a pressure as the front wheels. The automatic reducing valve will become operative at the proper time since it is controlled by the rate of deceleration. The predetermined rate at which it is desirable to have the reducing valve mechanism become operable is controlled by the angle of inclination of the track which is adjustable. Also, the fixed difference in pressure which is desired between the pressure in the fluid motors of the front brakes and the pressure in the fluid motors of the rear brakes may be adjusted as desired by varying the tension of the spring 25 by means of the adjusting bolt 27.

The use of the reducing valve mechanism is also very beneficial during braking on wet, muddy or icy roadways. Under these conditions it is generally desirable to have both the front and rear brakes applied with uniform pressure because if the front wheel brakes have too much braking pressure they will tend to lock and cause front wheel skids. Due to the decreased friction between the wheels and the roadway when the roadway is wet, muddy or icy, the rate of deceleration of the vehicle cannot be increased as rapidly as when the roadway is dry. Therefore, if the angle of inclination of the track is set to be quite large, it will be impossible, due to the said low friction between the tires and the roadway, to attain such a rate of deceleration that the reducing valve mechanism will become effective. Thus the front and rear wheel brakes will be applied with uniform pressure during the entire period of stopping of the vehicle.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In fluid pressure braking apparatus for a vehicle, two brakes, means for actuating the brakes comprising a source of pressure, a fluid motor associated with each brake and conduit means for connecting said motors to the source of pressure to permit fluid under pressure to be supplied to the motors, and means operable automatically in response to deceleration of the vehicle for causing the fluid pressure being supplied by the source to one of the motors of said brakes to be a predetermined value less than that supplied by said source to the other motor, said means comprising a rolling ball mounted on an inclined track.

2. In fluid pressure braking apparatus for a vehicle, two brakes, means for actuating the brakes comprising a source of pressure, a fluid motor associated with each brake and conduit means for connecting said motors to the source of pressure to permit fluid under pressure to be supplied to the motors, and means associated with the conduit means leading to one fluid motor of said brakes for automatically causing the pressure of the fluid in said motor to be a different value than the pressure of the fluid in the other motor when the fluid under pressure is supplied from said source, said means comprising a valve seat and a cooperating rolling ball so mounted as to be movable to a valve closed position in response to deceleration of the vehicle, and a second valve movable off its seat against a predetermined resistance and in the direction of flow of fluid toward the said one fluid motor.

3. In fluid pressure braking apparatus for a vehicle, a plurality of sets of brakes, means for actuating the brakes and comprising a source of pressure, a fluid motor associated with each brake and conduit means for connecting said motors to the source of pressure to permit fluid under uniform pressure to be supplied to the motors, and means associated with the conduit means leading to one set of brakes for automatically causing the pressure of the fluid in the fluid motors of said one set of brakes to be a different value than the pressure of the fluid in the fluid motors of the other set of brakes when fluid under pressure is supplied from said source, said means comprising a valve seat and a cooperating rolling ball so mounted on an inclined track as to be movable to valve closed position in response to deceleration of the vehicle and a second valve movable off its seat against a predetermined resistance and in the direction of flow of fluid toward the fluid motors of said one set of brakes.

4. In fluid pressure braking apparatus for a vehicle, a plurality of sets of brakes, means for actuating the brakes and comprising a source of pressure, a fluid motor associated with each brake and conduit means for connecting said motors to the source of pressure to permit fluid under uniform pressure to be supplied to the motors, and means associated with the conduit means leading to one set of brakes for automatically causing the pressure of the fluid in the fluid motors of said set of brakes to be a different value than the pressure of the fluid in the fluid motors of the other set of brakes when fluid under pressure is supplied from said source, said means comprising a valve seat and a cooperating rolling ball so mounted on an inclined track as to be movable to valve closed position in response to deceleration of the vehicle, a by-pass around said valve, and a normally spring-closed valve for the by-pass and permitting fluid to flow through the by-pass from the source of pressure to the fluid motors of one set of brakes only when the fluid pressure of said source is a predetermined amount greater than the fluid pressure in said motors.

5. In fluid pressure braking apparatus for a vehicle, a plurality of brakes, means for actuating the brakes and comprising a source of pressure, a fluid motor associated with each brake and conduit means for connecting said motors to the source of pressure to permit fluid under uniform pressure to be supplied to the motors, means associated with the conduit means leading to the fluid motor of one of the brakes for automatically causing the pressure of the fluid in said fluid motor to be a different value than the pressure of the fluid in the fluid motor of the other brake when fluid under pressure is supplied from said source, said means comprising a valve element movable off its seat in the direction of flow of fluid toward the motor of said one brake, a spring for closing said valve, a passage through the valve element, and an inertia-controlled valve means for closing the passage in response to deceleration of the vehicle.

6. In fluid pressure braking apparatus for a vehicle, front and rear wheel brakes, means for actuating the brakes and comprising a source of pressure, a fluid motor associated with each brake and conduit means for connecting said motors to the source of pressure to permit fluid under uniform pressure to be supplied to the motors, means associated with the conduit means leading to the rear brakes for automatically causing the pressure of the fluid in the fluid motors of said rear brakes to be a different value than the pressure of the fluid in the fluid motors of the front brakes when fluid under pressure is supplied from said source, said means comprising a valve element movable off its seat in the direction of flow toward the motors of the rear brakes, a spring for closing said valve element, a passage through the valve element, and valve means comprising a rolling ball subject to the action of inertia during deceleration of the vehicle for closing the passage and preventing flow of fluid therethrough in the direction of said motors.

7. In fluid pressure braking apparatus for a vehicle, two brakes, means for actuating the brakes and comprising a source of pressure, a fluid motor associated with each brake and conduit means for connecting said motors to the source of pressure to permit fluid under pressure to be supplied to the motors, and valve means associated with the conduit means leading to the fluid motor of one of said brakes, said valve means comprising a casing provided with a valve seat, a movable valve element cooperating with the seat and movable off said seat in the direction of flow of fluid from the source to the motor, a spring for biasing said valve element to closed position, means forming a passage through said element and means comprising an element responsive to the deceleration of the vehicle for preventing fluid from flowing through said passage in a direction from the source to the motor.

8. In fluid pressure braking apparatus for a vehicle, two brakes, means for actuating the brakes and comprising a source of pressure, a fluid motor associated with each brake and conduit means for connecting said motors to the source of pressure to permit fluid under pressure to be supplied to the motors, and valve means associated with the conduit means leading to the fluid motor of one of said brakes, said valve means comprising a casing interposed in the conduit and provided with a valve seat, a movable valve element cooperating with the seat and movable off said seat in the direction of flow of fluid through said casing from the source to the motor, a spring for biasing said valve element to closed position, means for varying the tension of the spring, means forming a passage through said valve element, a valve seat associated with said passage, a rolling ball for cooperation with the seat and movable off said seat in the direction of flow of fluid through said casing from the motor to the source, and a track for said ball, said track being inclined in such a manner that the ball is normally held off its seat by the action of gravity and movable onto its seat in response to deceleration of the vehicle.

9. In fluid pressure braking apparatus for a vehicle, two brakes, means for actuating the brakes and comprising a source of pressure, a fluid motor associated with each brake and conduit means for connecting said motors to the source of pressure to permit fluid under pressure to be supplied to the motors, and valve means associated with the conduit means leading to the fluid motor of one of said brakes, said valve means comprising a casing interposed in the conduit and provided with a valve seat, a movable valve element cooperating with the seat and movable off said seat in the direction of flow of fluid through the casing from the source to the motor, a spring for biasing said valve element to closed position, means forming a passage through said valve element, a valve seat associated with said passage, a rolling ball for cooperation with the seat and movable off said seat in the direction of flow of fluid through said casing from the motor to the source, a track for said ball, said track being inclined in such a manner that the ball is normally held off its seat by the action of gravity and movable onto its seat in response to deceleration of the vehicle, and means for adjustably mounting the casing so as to vary the inclination of the track.

WALTER R. FREEMAN.